United States Patent

Wang et al.

[11] Patent Number: 5,902,467
[45] Date of Patent: May 11, 1999

[54] OXYGEN SENSOR BASED ON A METAL-AIR BATTERY

[75] Inventors: Annie Q. Wang, Pittsburgh; P. Richard Warburton, Moon Township, both of Pa.

[73] Assignee: Industrial Scientific Corporation, Oakdale, Pa.

[21] Appl. No.: 08/963,250

[22] Filed: Nov. 3, 1997

[51] Int. Cl.$^6$ ............................................... G01N 27/404
[52] U.S. Cl. .................... 204/415; 204/406; 204/408; 204/431; 205/783
[58] Field of Search ............................ 204/406, 415, 204/431, 432, 408; 205/782, 782.5, 783

[56] References Cited

U.S. PATENT DOCUMENTS

| | | | |
|---|---|---|---|
| 2,805,191 | 9/1957 | Hersch | 204/431 |
| 2,861,926 | 11/1958 | Jacobson | 204/432 |
| 2,913,386 | 11/1959 | Clark | 204/415 |
| 3,000,805 | 9/1961 | Carritt et al. | 204/415 |
| 3,071,530 | 1/1963 | Neville | 204/415 |
| 3,767,552 | 10/1973 | Lauer | 204/415 |
| 3,824,166 | 7/1974 | Deibert | 204/432 |
| 4,132,616 | 1/1979 | Tantram et al. | 204/415 |
| 4,207,146 | 6/1980 | Kunke | 204/415 |
| 4,446,000 | 5/1984 | Cullinane | 204/415 |
| 4,469,562 | 9/1984 | Chang | 204/415 |
| 4,495,051 | 1/1985 | Fujita et al. | 204/415 |
| 4,571,292 | 2/1986 | Liu et al. | 204/415 |
| 4,627,906 | 12/1986 | Gough | 204/415 |
| 4,664,119 | 5/1987 | Bessman et al. | 204/431 |
| 4,664,773 | 5/1987 | Suzuki et al. | 204/406 |

*Primary Examiner*—T. Tung
*Attorney, Agent, or Firm*—Dennison, Meserole, Scheiner & Schultz

[57] ABSTRACT

An oxygen sensor based on a metal-air cell, typically a commercially available zinc-air battery of the type used in hearing aids. The cell, which admits oxygen to generate electric current at its cathode is disposed in a mechanical housing which restricts the flow of oxygen to the cell, and is connected to an electrical circuit which provides a variable resistance load, the load increasing as current flow through the circuit decreases, to prevent hydrogen evolution at the cathode. Current flow through the cell is measured, and is proportional to oxygen concentration.

20 Claims, 3 Drawing Sheets

OXYGEN SENSOR BASED ON A METAL-AIR BATTERY

BACKGROUND OF THE INVENTION

1. Field of the Invention

This invention relates to electrochemical oxygen sensors, and particular to the adaptation of commercially available metal-air batteries that are normally used to supply power for hearing aids and similar devices for use as oxygen sensors of high precision and repeatability. The use of a commercially available battery already being manufactured in high volumes, such as zinc-air hearing aid batteries, will provide low cost, disposable oxygen sensors. The combination of low cost and high performance will make them suitable for a number of applications including confined space monitoring for worker safety, medical applications relating to anaesthesiology, respiratory therapy and the like, and the monitoring of industrial processes where the oxygen concentration level is critical.

2. Description of Related Art

Prior art electrochemical oxygen sensors have been based on custom designed electrode/electrolyte systems housed in custom fabricated housings. This approach has led to a number of successful oxygen sensors that are costly to produce, examples of which are disclosed in U.S. Pat. Nos. 2,913,386, 3,767,552 and 4,132,616. Devices manufactured according to these patents tend to be expensive because they are custom designed for the purpose of detecting oxygen, and are produced in small manufacturing volumes relative to common batteries. Zinc-air batteries, on the other hand, are metal-air batteries that are manufactured in large quantities and at a very low per-unit cost.

Prior art disposable oxygen sensors have employed a polarizable cathode of carbons and metals, and metallic anodes that are generally nonpolarizable at the relatively low current densities found in these sensors. In all of these sensors the cathode is maintained at a potential that is sufficiently negative relative to the electrolyte to promote the reduction of the oxygen on the cathode surface. This potential, or bias, for the cathode is obtained in several ways depending on the type of materials used for the cathode and anode, and depending on the choice of electrolyte between cathode and anode.

As disclosed in U.S. Pat. No. 2,913,386, the classic Clark oxygen sensor uses a platinum cathode and a silver-silver chloride anode, with an aqueous sodium chloride electrolyte; the cathode and anode are biased externally with a constant potential of 0.8 volts maintained between sensor terminals (cathode made more negative than anode). Without the external voltage source the cell does not respond to oxygen.

A similar sensor described in U.S. Pat. No. 3,000,805 uses the same anode and cathode materials, but the electrolyte is either aqueous potassium chloride or potassium hydroxide, the latter being recommended. The potential of the cathode is held constant at 0.9 volts negative with respect to the anode. In both of these disclosures the potential between electrodes is held constant with a battery and variable resistor.

The practice of operating oxygen sensors at fixed potential, with a potentiostat or other suitable electric circuit has been widely adopted (I. Fatt, "Polarographic Oxygen Sensors", Robert E. Krieger Publ. Co., Malabar, Fla., 1982). Other oxygen sensors, referred to as fuel cell sensors, supply their own power and bias to the cathode by the consumption of a fuel at the anode. The anode, via the external electrical circuit is a source of electrons for the cathode. In some cases the anode can be a catalytic electrode that consumes a gaseous fuel such as hydrogen, but in many cases the anode is a metal that corrodes in the presence of the reaction product of the cathode. These types of fuel cell sensors are known as galvanic oxygen sensors. Examples of such sensors are disclosed in U.S. Pat. Nos. 3,767,552 and 4,132,616 which use lead (Pb) as the consumable anode with a caustic electrolyte.

U.S. Pat. No. 2,805,191 cites the use of cadmium, lead, antimony arsenic, and copper as possible anode materials with various electrolytes. Sensors using these metals as anodes are unique in being able to operate with only a simple load resistor to complete the circuit between the anode and the cathode.

In the prior art, zinc has been specifically excluded as a possible galvanic oxygen sensor anode, with any electrolyte, by both U.S. Pat. Nos. 2,805,191 and 4,132,616, because zinc can cause hydrogen evolution at the cathode in the absence of oxygen. Tin has also been avoided with caustic electrolytes due to the risk of hydrogen evolution. Zinc however offers many advantages in this application compared to alternative metals such as lead, including availability at relatively low cost, high energy density and relatively environmentally benign properties.

The problems of hydrogen evolution associated with the use of zinc as the oxygen sensor anode do not occur when zinc is used as the anode in a power generating metal-air battery at normal atmospheric oxygen concentrations. In a typical battery application most of the zinc potential appears across the battery load, and the air electrode is only moderately polarized into the cathodic region, thus avoiding hydrogen evolution. However, in a typical galvanic oxygen sensor, the percentage of the zinc potential applied to the air electrode always approaches 100 percent as the oxygen concentration goes to zero and/or the load resistor is reduced to improve sensor response time.

This high potential across the cathode under low oxygen conditions results in the evolution of hydrogen at the cathode, producing as a consequence an erroneous signal with a high baseline and the risk of cell leakage due to the buildup of hydrogen gas within the sensor. The smaller the load resistor in such an oxygen sensor, the sooner hydrogen evolution begins as the oxygen level drops toward zero before the rate of hydrogen evolution becomes significant. It is not necessary for the oxygen level to be reduced all the way to zero.

The high surface area electrodes commonly used in zinc-air cells behave as though the electrodes have a large capacitance, defined as $C=dQ/dE$, where $dQ$ is the charge passed for a small change in potential $dE$. The combination of this capacitance with the load resistance and cell resistance results in the response time of the sensor to changes in oxygen concentration being determined by the electrical time constant(s) of the cell and external circuit. The use of large load resistors to reduce the magnitude of the hydrogen evolution process results in long sensor response times. For practical implementation, the use of a zinc-air cell with a simple load resistor produces an unacceptable compromise between excessive response time and lower limit of measurable oxygen range prior to the onset of hydrogen evolution and associated unacceptable baseline signals.

U.S. Pat. No. 4,132,616 indicates that metals such as zinc and tin may be used if an external bias circuit is used to keep the potential of the cathode away from the hydrogen evolution region. The bias potential needs to be held at a value where oxygen reduction occurs under diffusion control and yet hydrogen evolution does not yet occur, as with the other so called controlled potential oxygen sensors discussed above.

One example of an oxygen sensor based on a zinc-air cell is disclosed in U.S. patent application Ser. No. 08/620,944, filed Mar. 22, 1996, in which a controlled potential of −0.6V was applied to the cell. The cell used in this example was a zinc-air battery design which had been internally modified to make it suitable for use as an oxygen sensor.

The evolution of hydrogen in oxygen sensors using zinc metal anodes in some cases may be used to provide the sensing mechanism, such as the Jacobson cell in which the oxygen depolarizes the hydrogen formed at the outer surface of a porous hollow carbon rod cathode (Jacobson, M. G.; *Analytical Chemistry*, (1953), 25, 585). A similar hydrogen depolarization mechanism is described in U.S. Pat. No. 4,664,119 in which any metal more electronegative than hydrogen can be used for the anode.

Another aspect of state of the art oxygen sensors as described by U.S. Pat. Nos. 3,767,552 and 4,132,616 is the use of a diffusion barrier between the oxygen atmosphere being measured and the oxygen electrode inside the sensor. The oxygen sensor signal magnitude is then proportional to the rate of diffusion through the barrier, provided that all the oxygen reaching the electrode is reduced. In order to operate in this mode, the oxygen cathode must have sufficient reserve activity that the cathode reaction is controlled by diffusion. Variations in cathode activity due to manufacturing variations and ambient temperature changes are then either small or undetectable in sensor output current response to oxygen concentration. In addition to controlling the signal from the oxygen sensor, the diffusion barrier reduces the rate at which sensor contaminants enter the sensor and also reduces the rate at which water from the electrolyte is exchanged with the atmosphere outside the sensor.

The diffusion barrier can be a solid polymer membrane, as in the case of U.S. Pat. No. 3,767,552, a small orifice or capillary as in the case of U.S. Pat. No. 4,132,616, or a porous body as in the case of U.S. Pat. No. 4,446,000.

The design of the diffusion barrier is also a useful means for optimizing the sensor for a particular concentration or range of concentrations of oxygen to be monitored. For instance, when measuring oxygen concentrations near 100%, a more restrictive diffusion barrier may be desirable to assure sensor responsivity. At lower concentrations a less restrictive barrier may be desirable to provide a larger signal.

A metal-air battery employs diffusion limiting membranes similar to the oxygen sensors described above, but the intended rate of diffusion is much higher than needed to detect oxygen. While the higher oxygen consumption rate is essential for the battery to supply high output current, it is a disadvantage in the case of the oxygen sensor where the higher cell current unnecessarily shortens sensor life. A more restrictive opening to the atmosphere also better protects the electrodes and electrolyte against damage from humidity changes and contaminants outside the sensor and provides for a more stable output signal as environmental conditions change and as the cell ages.

SUMMARY OF THE INVENTION

It is therefore an object of the invention to utilize a standard power producing device, a metal-air battery, as a highly responsive oxygen sensor.

To achieve this and other objects, a metal-air cell, typically a commercial, off-the-shelf zinc air button cell is arranged in conjunction with an additional diffusion barrier and connected to a modified load resistor. Current is generated by the oxidation of the zinc anode and reduction of oxygen at the cathode, the latter process being limited by the rate at which oxygen can diffuse into the cell. This current is measured as a potential across the load resistor. In series with the load resistor are a parallel high resistance path and a low resistance path, selectable by an electronic switch, controlled by the current flowing through the load resistor. For larger currents, in the presence of oxygen, the switch selects the low resistance path; for smaller currents, under low oxygen conditions, the switch selects the high resistance path. This circuit allows the use of a low value load resistance for normal operation, with fast response times to changes in oxygen concentration, but prevents the problems of hydrogen evolution at low oxygen concentrations.

The circuit associated with the metal-air cell is assembled from standard components well known to those skilled in the art.

Additional benefits are derived if the metal-air cell is mounted in an electrically nonconductive housing that is gas tight and that contains a diffusion limiting device. The diffusion limiting device can be a thin solid polymer membrane, a small open orifice, a porous body or a defined gas diffusion path. The side of the metal-air cell that is responsive to oxygen is sealed to the diffusion barrier end of the enclosure by compressing a rubber o-ring between the enclosure and the cell. Electrical contacts on the housing are connected to the two terminals of the cell.

The addition of a diffusion barrier provides many benefits over reliance on the self contained diffusion limiting built into the metal-air cell. Firstly, the added diffusion barrier restricts the rate of oxygen ingress into the cell and hence the rate of oxygen reduction at the air electrode is kept below the capacity of the air electrode. Diffusion limiting allows the metal-air cell performance to deteriorate significantly (lose capacity) before sensor performance is adversely affected, because the diffusion barrier and not the cell now determines the sensor current. The effects of variations between cells is reduced, since the external diffusion barrier is reused upon replacement of the cell. Variations in output from the cell may occur during the lifetime of the cell, and the use of an external diffusion barrier reduces the influence of these variations on the overall response to oxygen, since the diffusion barrier at least in part determines the sensor current.

Further, by reducing the flux of oxygen to the cathode, the total sensor current is reduced, thus reducing the rate of consumption of the metal anode material inside the cell and extending the life of the oxygen sensor beyond what would be expected without the additional diffusion barrier.

Also, the more restrictive diffusion barrier provides better protection of the electrodes and electrolyte from water loss and gain under varying humidity conditions and also minimizes the influx of materials, such as carbon dioxide, that could shorten the operating life of the sensor.

DESCRIPTION OF THE PREFERRED EMBODIMENTS

Figure 1:
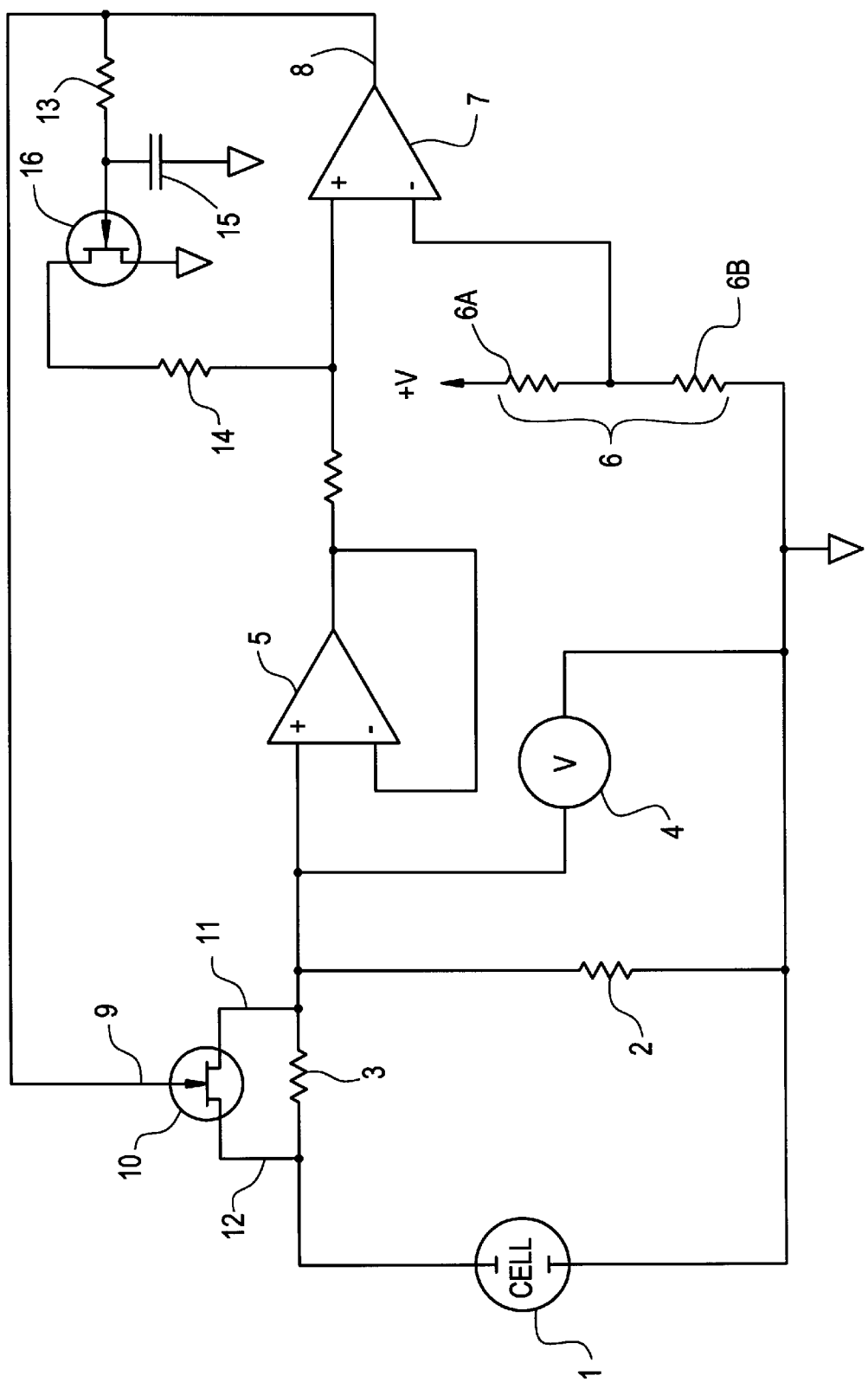
FIG. 1 is a schematic diagram of metal-air cell and modified resistive load circuit, according to the invention.

The oxygen sensor cell of the invention is preferably selected from commercially available, nominally 1.4V, zinc-air batteries of sizes such as 630, 675, 312, and 13, available from Duracell Inc, Bethel, Conn. 06801 and other battery manufacturers. As shown in FIG. 1, cell 1 is connected to a load resistor 2 and safety resistor 3 in series. Oxygen diffuses into cell 1 resulting in an electric current flow through the external circuit comprised of load resistor 2 and safety resistor 3. The resulting potential difference measured by voltmeter 4 across load resistor 2 provides a measure of the current flowing through the cell and thus the oxygen concentration. The potential difference across load resistor 2 is amplified by an amplifier 5, and compared to the potential from a two resistor potential divider 6, by comparator 7. If the potential difference across load resistor 2 is greater than the potential of the two resistor potential divider 6, then the output 8 from the comparator 7 is logically high. On the other hand, if the potential difference across the load resistor 2 is less than the potential of the two resistor potential divider 6, then the output 8 from comparator 7 is logically low. The output 8 of the comparator 7 is connected to gate 9 of a field effect transistor 10, such that the field effect transistor 10 allows conduction between source 11 and drain 12 terminals when the output 8 from comparator 7 is logically high; field effect transistor 10 does not allow conduction between source 11 and drain 12 terminals when the output 8 from comparator 7 is logically low. The resistor values of potential divider 6 are selected such that in the event that the oxygen concentration becomes very low to a level where hydrogen evolution is likely, the output 8 from comparator 7 becomes logically low, resulting in the field effect transistor 10 having a high impedance between its source 11 and drain 12 terminals. Typical values for the resistors in potential divider 6 are 20 kΩ for resistor 6a and 750 Ω for resistor 6b.

Thus, when cell current output is low, the current from the cell must pass through the safety resistor 3, and the total resistance of the load circuit (load resistor 2 and safety resistor 3) is now high enough that significant hydrogen evolution is prevented. The typical value for the load resistor 2 is 50 Ω and for the safety resistor 3 is 300 Ω.

If the oxygen concentration is increased, the current from the cell will increase and the output 8 from comparator 7 will become logically high. In this event, the field effect transistor 10 will again be conductive between its source 11 and drain 12 terminals; the current now bypasses the safety resistor 3 and the overall load resistance of the cell is low.

The comparator 7 is also connected to a feedback circuit comprising resistors 13 and 14, together with capacitor 15 and transistor 16. This feedback circuit creates a time delay after the output 8 of comparator 7 switches, thereby preventing oscillation when the voltage across load resistor 2 is near the potential from potential divider 6.

The invention thus overcomes the prior art conflict between the requirement for a high load resistance to protect the circuit under low current conditions from hydrogen evolution, and yet keep the load resistance small enough so that the response time of the sensor and circuit are acceptable.

An additional benefit may be obtained by replacing resistor 2 with a temperature sensitive network so as to offset changes in sensor output that are due solely to temperature changes and that are not the result of changes in oxygen concentration. Temperature sensitive networks, including such temperature sensitive components as thermistors and semiconductor devices, are well known to those skilled in the art and will be determined in practice by the temperature characteristics of the diffusion limiting mechanism in the metal-air cell. The temperature compensation network may also be placed elsewhere in the circuit, according to principles well known to those skilled in the art.

Variations may also be made in the switched load circuit, with electrical components acting as a voltage controlled resistor. The resistance value of the voltage controlled resistor is similarly controlled by the current flowing through the load resistor, such that the overall external load on the cell is low in the presence of oxygen, but it increases to a higher resistance in the absence of oxygen or under conditions of low oxygen concentration, so as to reduce the extent of hydrogen evolution. The design and implementation of a voltage controlled resistor circuit is also well known to those skilled in the art.

Although a metal-air cell is made more reliable for the detection of oxygen concentration by incorporating a switched high resistance load to reduce the extent of hydrogen evolution as described above, still further improvement is possible by adding a diffusion barrier between the air port of the cell and the oxygen containing atmosphere being monitored.

Figure 2:
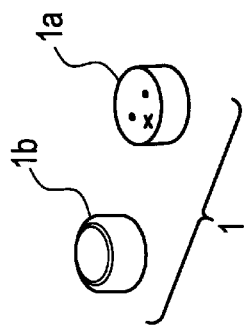
FIG. 2 is a perspective view of a metal-air button cell.

FIG. 2 shows two opposite views of a typical zinc-air cell 1. The larger metal side 1a, typically marked "+", contains one or more holes allowing entry of oxygen to the interior of the can. The other parallel surface 1b is the negative or "−" terminal of the cell, and it is via these two terminals that electrical connection is made to the cell. In addition, oxygen must be made available to the small holes on the "+" side 1b of the cell for the cell to function. It is important that all of the holes found on this side of the cell be exposed to the oxygen containing atmosphere and that the holes not be blocked so as to prevent oxygen from entering the battery.

Figure 4:
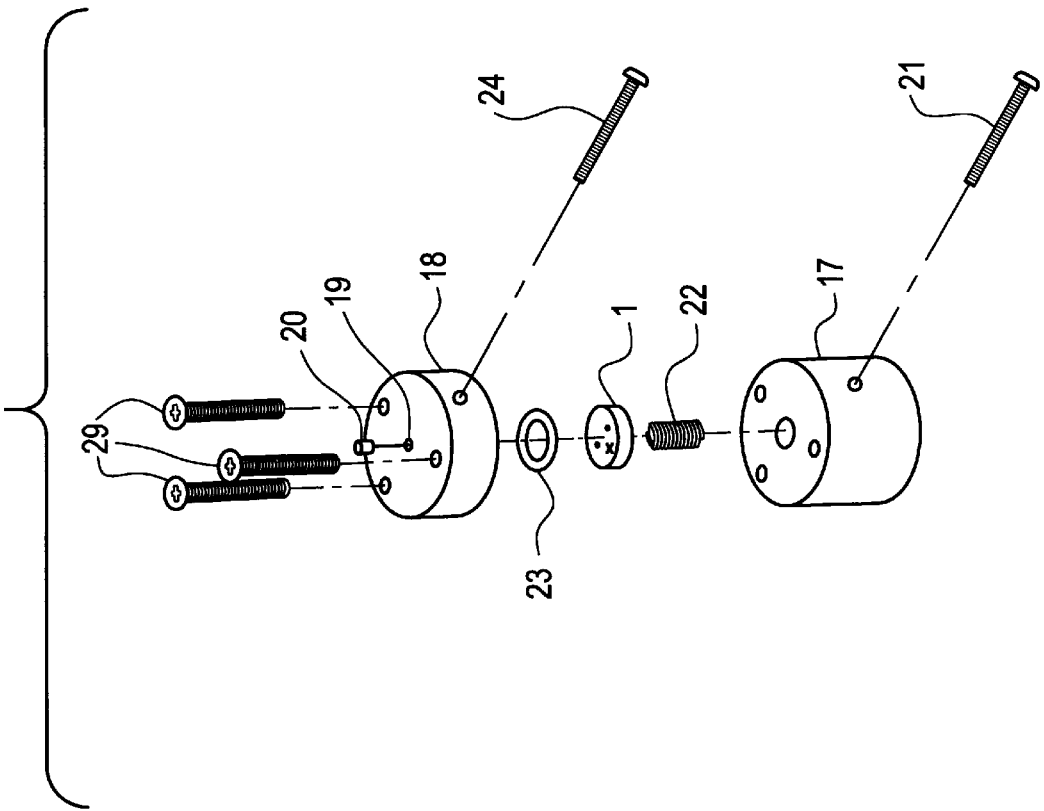
FIG. 4 is an exploded perspective view of the cell and housing of FIG. 3.
Figure 3:
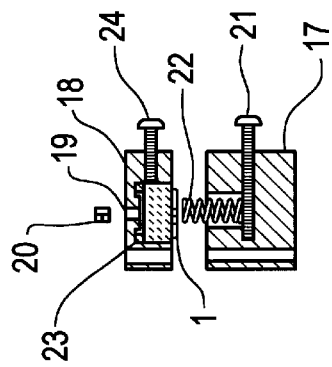
FIG. 3 is a longitudinal cross-sectional view of a metal-air button cell and housing according to the invention.

FIGS. 3 and 4 show a mechanical housing for the apparatus of the invention. Lower housing 17 and upper housing 18 are made of a non-conductive material such as ABS plastic or other polymer. Fasteners 29 connect the upper and lower housings and hold the housings rigidly together, and may be metal or plastic screws, rivets or pins. Upper housing 18 contains a small hole 19 through which air will pass to the cell. A diffusion limiting device 20 may be used in conjunction with hole 19. This diffusion limiting device 20 may be a plug of glass or ceramic of a predetermined length and having a precision orifice drilled at the center of its diameter and for its entire length, the plug being pressed into hole 19. Alternatively, device 20 may be a membrane barrier or porous material. It is important that the joint between hole 19 and the device 20 be gas tight and impermeable to oxygen and may be sealed with an adhesive or sealant. In another embodiment, device 20 is eliminated and the length and diameter of hole 19 is then adjusted to form a precision capillary to provide the required diffusion barrier.

Screw 21 is threaded into lower housing 17 to form both a mechanical support and electrical contact for a spring 22 positioned in a longitudinal recess in the lower housing. The negative side 1a of cell 1 is positioned against spring 22, with the air access holes of cell 1 facing toward hole 19. O-ring 23 is interposed between the positive side 1a of cell 1 and upper housing 18. Upper housing 18 is then held tightly against lower housing 17 while fasteners 29 are installed. Both spring 22 and O-ring 23 must be under sufficient pressure to assure that the only path available for oxygen to reach the air access holes of cell 1 is through the diffusion limiting means used in conjunction with hole 19. After fasteners 29 are installed, a screw 24 is threaded into upper housing 18 to make contact with the positive side 1a of cell 1. Screw 24 is the positive connection to the oxygen sensor while screw 21 is the negative connection to the oxygen sensor.

Many variations of this assembly are possible, including the incorporation of lower housing 17 and upper housing 18 into a larger housing designed to contain an entire oxygen monitoring instrument, as well as the use of different spring arrangements to make electrical contact to cell 1.

A particular variation of the above assembly that is of interest and within the scope of this invention is the use of a porous body for device 20. The porous body can be a sintered polymer, ceramic, or metal, or can be made from selected natural substances such as wood as disclosed in U.S. Pat. No. 4,446,000.

Another variation of the above assembly that is also within the scope of this invention is the use of a porous or gas permeable membrane as the diffusion limiting device. This membrane is preferably made of a polymeric material and most preferably of 0.001 inch PFA Teflon (E. I. du Pont de Nemours) for one embodiment, while in another embodiment 0.001 inch FEP Teflon (E. I. du Pont de Nemours) is preferred. Other polymeric materials known to those skilled in sensor design may be used, and any suitable attachment method may be used.

Another variation of the above assembly that is also within the scope of this invention is the use of an air space of defined volume through which the oxygen from the external environment must diffuse to reach the cell as device 20. The dimensions of the air space may be varied to effect changes in the external diffusion barrier, as is well known to those skilled in the art. Combinations of these methods for creating external diffusion barriers are also considered within the scope of this invention.

Another variation that is also within the scope of this invention is the use of a metal air cell held at constant applied potential between 0.4 and 1.0 V by an external circuit which substitutes for the switching circuit shown in FIG. 1, with the cell placed behind an external diffusion barrier as discussed above. A circuit which will provide a constant potential to the cell and provide means for measuring the current flowing through the cell is shown in FIG. 5.

Figure 5:
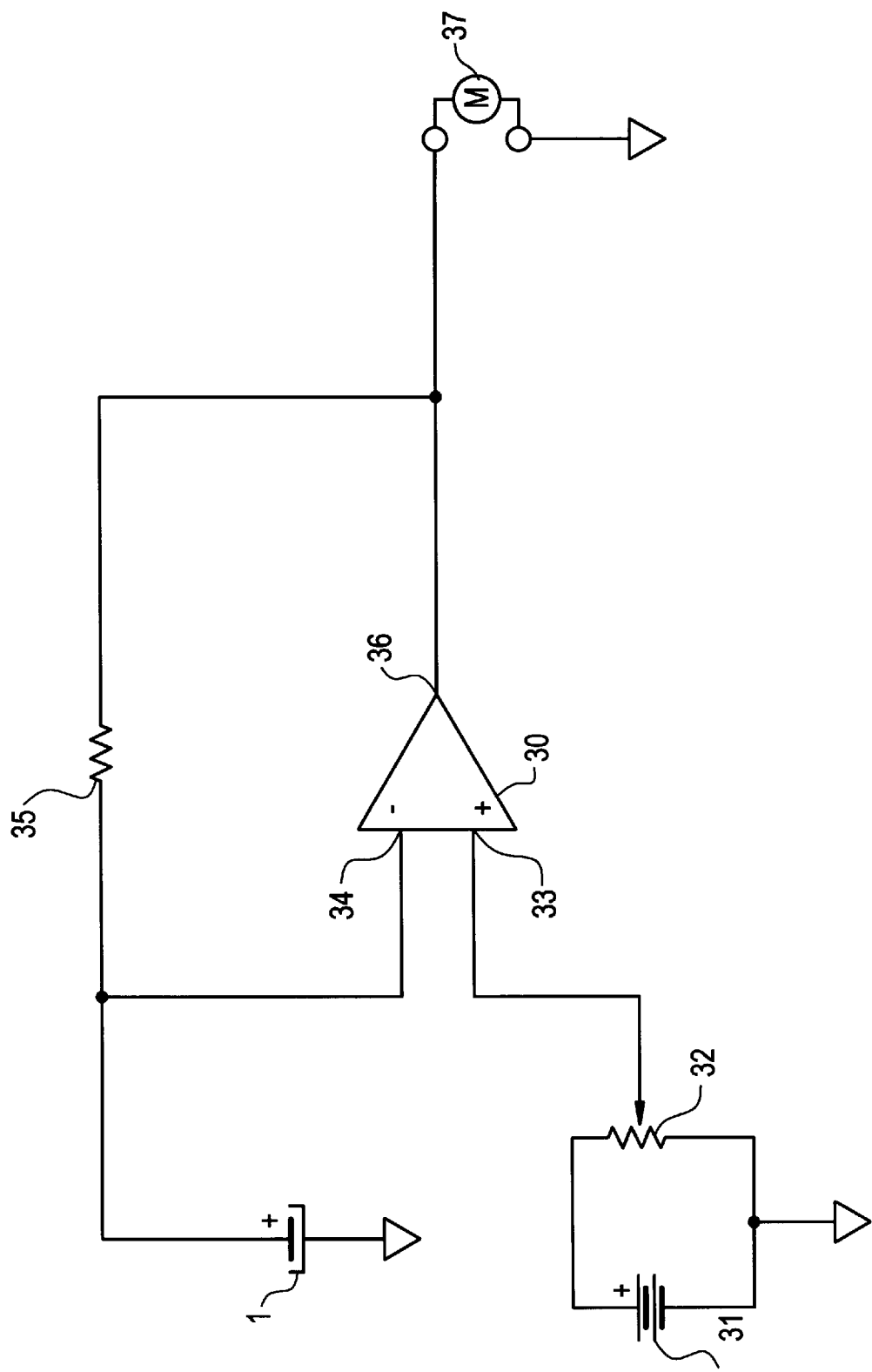
FIG. 5 is a schematic diagram of a further embodiment of the invention.

As shown in FIG. 5, metal-air cell 1 is connected to an operational amplifier 30, a standard device well known to those skilled in the electronics art, for example a Linear Technology type LT1012. A fixed voltage reference 31 and variable resistor 32 establish the voltage at non-inverting (+) input 33 of operational amplifier 30 to be in the desired sensor operating range of 0.4 to 1.0 volts. The combination of voltage reference 31 and variable resistor 32 represents one of many ways to produce a steady reference voltage that are known to those skilled in the art. Metal-air cell 1 is connected to operational amplifier 30 such that the positive terminal (air electrode) of metal-air cell 1 is attached to the inverting (−) input 34 of operational amplifier 30. Resistor 35 is connected between the inverting input 34 of amplifier 30 and output 36 of amplifier 30. In this configuration the circuit functions to translate the current produced by metal-air cell 1 into a proportional voltage, at the output 36 of amplifier 30. The voltage between output 36 and ground is measured by a meter 37.

This circuit constitutes a feedback amplifier configuration commonly known as a current-to-voltage converter to those skilled in electronics and also to those skilled in the art of electrochemical sensor potentiostats.

Initially, after metal-air battery 1 is connected to the circuit, the voltage at the inverting input 34 of amplifier 30 is forced towards the open circuit voltage of metal-air battery 1. In the case of a zinc-air battery, for instance, this open circuit cell voltage will be approximately 1.4 volts.

Since the inverting input 34 of amplifier 30 is more positive than the non-inverting input 33, the output 36 of amplifier 30 will move in a negative direction to make the voltage at the inverting input 34 of amplifier 30 equal to voltage at the non-inverting input 33, effectively discharging metal-air cell 1 via resistor 35. The voltage at the output 36 of amplifier 30 will gradually become more positive as metal-air cell 1 discharges, until the voltage at the inverting input 34 is equal to the voltage at the non-inverting input 33 to amplifier 30. Additionally, the current flowing through cell 1 approaches a steady state value after the voltage at the inverting input 34 equals the voltage at the non-inverting input 33 of amplifier 30, indicating that the cell current is now controlled by the oxygen diffusion barrier built into metal-air battery 1 in conjunction with the external diffusion barrier.

While not essential, additional benefit may be obtained by replacing resistor 35 with a temperature sensitive network so as to offset changes in sensor output that are due solely to temperature changes and that are not the result of changes in oxygen concentration. Such networks, including temperature sensitive components such as thermistors and semiconductor devices, are well known to those skilled in the art and will be determined in practice by the temperature characteristics of the diffusion limiting mechanism in the metal-air battery.

The foregoing description of the invention has been directed to particular preferred embodiments for purposes of explanation and illustration. It will be apparent to those skilled in the art that many modifications and changes in the particular design of the electronic circuit and the external diffusion barriers used therein as well as in the method of use may be made without departure from scope and spirit of the invention and all such equivalent modifications and changes are considered to fall within the spirit and scope of the invention.

What is claimed is:

1. A sensor for measuring oxygen concentration comprising:

a metal-air cell which generates an electric current when exposed to oxygen comprising a casing having at least one port therein for admission of oxygen to serve as a cathode, a metal anode and first and second terminal means for making electrical contact with said anode and cathode, respectively;

electrical circuit means connected to said terminal means providing a variable resistive load across said terminal means, the resistive load increasing under conditions of low current output from the cell so as to reduce hydrogen evolution at the cathode, and means for measuring the current through the cell which is proportional to oxygen concentration.

2. A sensor according to claim 1, further comprising temperature sensitive circuit means for compensating for changes in sensor current output resulting from changes in the temperature of the sensor and unrelated to the oxygen concentration being measured.

3. A sensor according to claim 1, wherein the electrical circuit means comprises a low resistance pathway, a high resistance pathway and an electrical switching means which switches therebetween.

4. A sensor according to claim 3, wherein the switching means includes at least one element selected from the group consisting of a relay, a bipolar transistor and a field effect transistor.

5. A sensor according to claim 3, wherein the switching means is controlled by current flowing through the sensor.

6. A sensor according to claim 1, wherein the metal-air cell is a zinc-air cell.

7. A sensor according to claim 1, additionally comprising a housing containing the metal-air cell, a means for restricting diffusion of oxygen to the port, and means for making electrical connection between the metal-air cell and the means for measuring the current.

8. A sensor according Lo claim 7, wherein the diffusion restricting means comprises a hollow capillary of predetermined length and width.

9. A sensor according to claim 7, wherein the diffusion restricting means comprises a porous body or a porous membrane.

10. A sensor according to claim 7, wherein the housing comprises an outside surface and a recess in which the cell is disposed, said diffusion restricting means being located between the cell and the outside surface, and said electrical connection means being disposed between the cell and the outside surface.

11. A sensor according to claim 10, wherein the housing is formed of first and second parts, and comprises means for attaching the first part to the second part along a joining surface of each part, the recess being disposed in the first part at the joining surface thereof.

12. An apparatus for oxygen measurement, comprising:
a mechanical housing having a recess therein adapted for receiving a metal-air cell having a port therein for admission of oxygen to serve as a cathode, a metal anode and terminal means for contacting the anode and the cathode, means for restricting diffusion of oxygen from an atmosphere being measured to the port of the metal-air cell, a means for making electrical connection with the terminal means of the metal-air cell, and electrical circuit means connected to said terminal means, said electrical circuit means providing a variable resistance load across said terminal means, with the resistance load across said terminal means increasing when current flow through the electrical circuit means decreases.

13. An apparatus according to claim 12, wherein the means for restricting diffusion is a polymer membrane.

14. An apparatus according to claim 12, wherein the means for restricting diffusion is a hollow capillary of predetermined length and width.

15. An apparatus according to claim 12, wherein the means for restricting diffusion is a porous body.

16. An apparatus according to claim 12, additionally comprising a metal air cell disposed in the recess.

17. An apparatus according to claim 16, wherein the metal-air cell is a zinc-air battery.

18. A sensor according to claim 12, wherein the housing comprises two assembled parts with the recess disposed therebetween, the housing being adapted for disassembly to access the recess.

19. A sensor according to claim 12, additionally comprising a temperature sensitive circuit means which compensates for changes in current flow resulting from temperature changes of the sensor.

20. A sensor according to claim 12, additionally comprising means for measuring electrical current flow connected to said electrical connection means.

* * * * *